US010412362B2

(12) United States Patent
Naing et al.

(10) Patent No.: US 10,412,362 B2
(45) Date of Patent: Sep. 10, 2019

(54) ACTIVE ALIGNMENT CORRECTION FOR OPTICAL SYSTEMS

(71) Applicant: QUALCOMM Incorporated, San Diego, CA (US)

(72) Inventors: Htet Naing, San Diego, CA (US); Kalin Mitkov Atanassov, San Diego, CA (US); Albrecht Johannes Lindner, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/661,599

(22) Filed: Jul. 27, 2017

(65) Prior Publication Data

US 2019/0037195 A1    Jan. 31, 2019

(51) Int. Cl.
  *H04N 5/225* (2006.01)
  *H04N 13/128* (2018.01)
  *H04N 5/232* (2006.01)
  *G06T 5/00* (2006.01)
  *G06T 7/521* (2017.01)

(52) U.S. Cl.
  CPC ........... *H04N 13/128* (2018.05); *G06T 5/006* (2013.01); *G06T 7/521* (2017.01); *H04N 5/2252* (2013.01); *H04N 5/2253* (2013.01); *H04N 5/23216* (2013.01); *G06T 2200/04* (2013.01); *G06T 2207/10024* (2013.01); *G06T 2207/10028* (2013.01); *G06T 2207/30252* (2013.01)

(58) Field of Classification Search
  CPC .. H04N 13/128; H04N 5/2252; H04N 5/2253; H04N 5/23216
  See application file for complete search history.

(56) References Cited

U.S. PATENT DOCUMENTS

| 5,250,227 | A | 10/1993 | Margolin |
| 5,610,528 | A | 3/1997 | Neely et al. |
| 7,814,801 | B2 | 10/2010 | Inamori |
| 8,436,836 | B2 | 5/2013 | Njolstad et al. |

(Continued)

FOREIGN PATENT DOCUMENTS

WO    2013009416 A2    1/2013

OTHER PUBLICATIONS

International Search Report and Wrfiten Opinion—PCT/US2018/039444—ISA/EPO—dated Sep. 14, 2018.

(Continued)

*Primary Examiner* — Twyler L Haskins
*Assistant Examiner* — Angel L Garces-Rivera
(74) *Attorney, Agent, or Firm* — Duane Morris LLP

(57) ABSTRACT

Methods, systems, and apparatuses are provided to compensate for a misalignment of optical devices within an imaging system. For example, the methods receive image data captured by a first optical device having a first optical axis and a second optical device having a second optical axis. The methods also receive sensor data indicative of a deflection of a substrate that supports the first and second optical devices. The deflection can result from a misalignment of the first optical axis relative to the second optical axis. The methods generate a depth value based on the captured image data and the sensor data. The depth value can reflect a compensation for the misalignment of the first optical axis relative to the second optical axis.

25 Claims, 7 Drawing Sheets

(56) References Cited

U.S. PATENT DOCUMENTS

| | | |
|---|---|---|
| 9,557,862 B2 | 1/2017 | Ho et al. |
| 2010/0208034 A1 | 8/2010 | Chen |
| 2012/0277531 A1 | 11/2012 | Krattiger et al. |
| 2013/0016186 A1* | 1/2013 | Atanassov ................ G06T 7/85 348/47 |
| 2015/0049172 A1 | 2/2015 | Ramachandra et al. |
| 2018/0252894 A1* | 9/2018 | Tang-Jespersen ....... G02B 7/32 |

OTHER PUBLICATIONS

Jia T., et al., "Depth Measurement Based on Infrared Coded Structured Light", Journal of Sensors, vol. 2014, Article ID 852621, 2014, 8 Pages.

\* cited by examiner

ACTIVE ALIGNMENT CORRECTION FOR OPTICAL SYSTEMS

BACKGROUND

Field of the Disclosure

This disclosure generally relates to optical systems and processes and more specifically relates to actively correcting misaligned components of an optical system.

Description of Related Art

Three-dimensional imaging and depth estimation technologies are of growing importance in many applications. To implement these three-dimensional imaging and depth estimation technologies, many optical systems incorporate multiple components that, when properly aligned and calibrated, capture image data characterizing a portion of an environment. To generate accurate depth values, the optical systems often maintain a specified positional relationship (e.g., a displacement, an orientation, etc.) between each of the components.

SUMMARY

Disclosed computer-implemented methods for generating at least one depth value can include receiving, by one or more processors, captured image data from a first optical device having a first optical axis or a second optical device having a second optical axis. The methods can further include receiving, by the one or more processors, sensor data indicative of a deflection of a substrate that supports the first and second optical devices. The deflection can result in a misalignment of the first optical axis relative to the second optical axis. The methods can include generating, by the one or more processors, a depth value based on the captured image data and the sensor data. The generated depth value can reflect a compensation for the misalignment of the first optical axis relative to the second optical axis.

A disclosed system for generating at least one depth value can include a non-transitory, machine-readable storage medium storing instructions, and at least one processor configured to be coupled to the non-transitory, machine-readable storage medium. The at least one processor can be configured to execute the instructions to receive captured image data captured by a first optical device having a first optical axis or a second optical device having a second optical axis. The at least one processor can be further configured to execute the instructions to receive sensor data indicative of a deflection of a substrate that supports the first and second optical devices. The deflection can result in a misalignment of the first optical axis relative to the second optical axis. The at least one processor can be configured to execute the instructions to generate a depth value based on the captured image data and the sensor data. The generated depth value can reflect a compensation for the misalignment of the first optical axis relative to the second optical axis.

A disclosed apparatus has means for receiving captured image data captured by a first optical device having a first optical axis or a second optical device having a second optical axis. The apparatus also includes means for receiving sensor data indicative of a deflection of a substrate that supports the first and second optical devices. The deflection can result in a misalignment of the first optical axis relative to the second optical axis. Additionally, the apparatus includes means for generating a depth value based on the captured image data and the sensor data. The generated depth value can reflect a compensation for the misalignment of the first optical axis relative to the second optical axis.

A disclosed non-transitory machine-readable storage medium has instructions that, when executed by at least one processor, perform a method. The method includes receiving captured image data captured by a first optical device having a first optical axis or a second optical device having a second optical axis. The method can also include receiving sensor data indicative of a deflection of a substrate that supports the first and second optical devices. The deflection can result in a misalignment of the first optical axis relative to the second optical axis. The method can include generating a depth value based on the captured image data and the sensor data. The generated depth value can reflect a compensation for the misalignment of the first optical axis relative to the second optical axis.

DETAILED DESCRIPTION

Figure 1A:
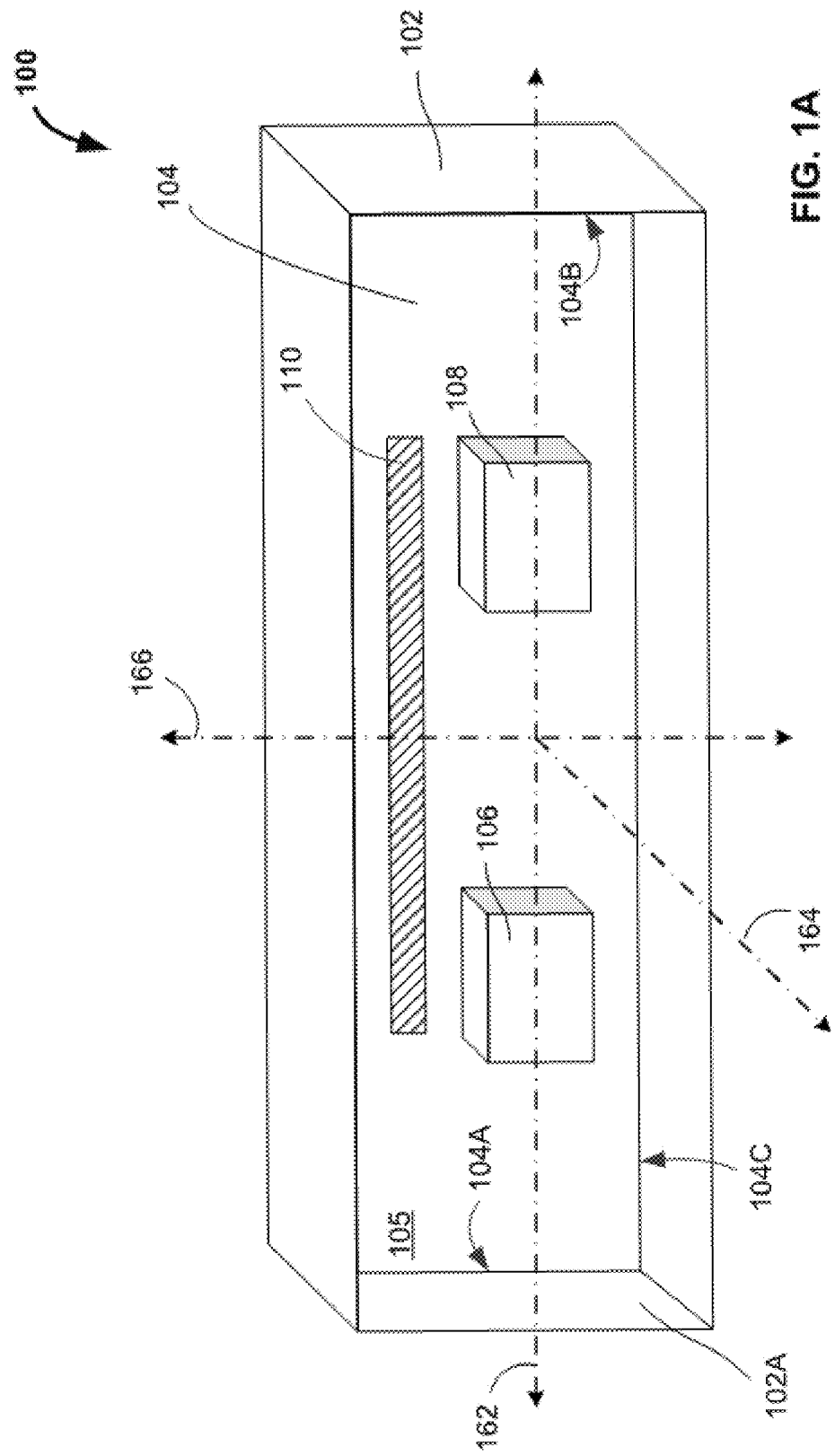
FIG. 1A is a perspective view of an exemplary imaging system, according to some examples.

While the features, methods, devices, and systems described herein can be embodied in various forms, some exemplary and non-limiting embodiments are shown in the drawings, and are described below. Some of the components described in this disclosure are optional, and some implementations can include additional, different, or fewer components from those expressly described in this disclosure.

Relative terms such as "lower," "upper," "horizontal," "vertical,", "above," "below," "up," "down," "top" and "bottom" as well as derivative thereof (e.g., "horizontally," "downwardly," "upwardly," etc.) refer to the orientation as then described or as shown in the drawing under discussion. Relative terms are provided for the reader's convenience. They do not limit the scope of the claims.

The inventors have determined that, for a device having two light sensing elements on a common substrate, any change in the positional relationship between the sensing elements can introduce errors into the depth map data generated by the device.

Three-dimensional imaging and depth estimation technologies are of growing importance in many applications, such as augmented-reality generation and presentation tools, autonomous driving and navigation applications, and three-dimensional metrology tools. To implement these technologies, many imaging systems incorporate multiple optical devices that, when properly aligned and calibrated, capture image data characterizing a portion of an environment (e.g., an "imaged" portion of the environment). The imaging systems can apply various image processing tools to generate a depth map that assigns, to each pixel within the imaged portion, a value characterizing a depth of a position within the imaged portion that corresponds to the pixel. In some examples, the imaging systems can generate the depth map based on an application of structured-light processes, stereo-vision processes, or time-of-flight processes to captured image data. Further, the imaging systems can include optical devices corresponding to these processes, such as cameras, imaging sensors (e.g., charge-coupled device (CCD) sensors), complimentary metal-oxide semiconductor (CMOS) imaging sensors, lasers emitting light having predetermined wavelength, such as infrared (IR) light (e.g., near-IR light), or other optical elements, such as diffraction gratings.

To generate depth values accurately across the imaged portion of the environment, imaging systems often maintain a specified positional relationship (e.g., a displacement, an orientation, etc.) between each of the multiple optical devices. For example, the imaging system can include two or more image sensors, e.g., CCD sensors, disposed at specified positions and orientations along a surface of a substrate or mounting assembly, such as a printed circuit board (PCB) mounted within a housing of the imaging system. Based on an application of the stereo-vision processes (e.g., triangulation) to image data captured by the CCD sensors, the imaging system can be calibrated to generate a depth map that is consistent with the specified positions and orientations of the CCD sensors, and that is accurate across the imaged portion of the environment.

Any change in the positional relationship between the optical components of the imaging system, such as the position or orientation of the CCD sensors, can introduce errors into the depth map generated by the imaging system. In some examples, as described below, the changes in the positional relationship can result from a predictable, intrinsic misalignment of the optical components. For instance, due to limitations in alignment tools or manufacturing conditions, the optical axes of the CCD sensors may not be exactly parallel, and the optical axes can exhibit an angular deviation from parallel that can be determined during an initial calibration process. This angular deviation is referred to herein as the "yaw angle". The imaging system can implement corrective processes that correct the depth values computed through the applied image processing techniques to reflect and account for the intrinsic misalignment of the optical components.

In other examples, the changes in the positional relationship of the optical components, and the underlying misalignment of these optical components, can result from external forces or bending moments applied to the imaging system during operations. For example, a user may attach the imaging system to a corresponding structure, such as a tripod, using an appropriate mounting bracket. In some instances, the mounting bracket applies an external force or bending moment on the housing of the imaging system, and this external force or bending moment can deflect the substrate or mounting apparatus and modify the orientation of the optical components. The resulting modification to the orientation of the optical components can modify a yaw angle characterizing each of the optical components. A change in the yaw angle can nullify any prior calibration of the imaging system, and introduce errors into the depth map data generated by the imaging system.

To identify and correct for the induced misalignment and resulting yaw-angle errors, the imaging system can be re-calibrated based on captured image data prior to each successive operation by a user. These recalibration processes may be time and resource intensive, and may reduce an ability of the imaging system to capture data characterizing rapidly occurring events. Moreover, processes that calibrate the imaging system and account for the intrinsic misalignment of the optical components, as described above, may not detect and correct for yaw-angle misalignments that result from a time-varying application of external force or bending moment to the housing of the imaging system.

The present disclosure provides a system, such as an imaging system, that detects a misalignment between axes of component optical devices, and actively corrects captured image data or generated depth map data for the detected misalignment. In some examples, described below, the imaging system corresponds to a dual-camera stereo-vision system that includes two or more image sensors (e.g., CCD sensors or CMOS sensors) disposed on a substrate. In other examples, the imaging system can represent a structured-light system that includes a structured-light transmitter—e.g., a near-IR laser—and a corresponding receiver (e.g., an image sensor capable of detecting IR (e.g., near-IR) radiation disposed on the substrate. Further, in additional examples, the imaging system can represent a time-of-flight system that includes a time-of-flight sensor and an RGB camera disposed on the substrate, or additional or alternative systems that includes multiple, calibrated and aligned components or devices. The imaging system can also include, or be coupled to, a depth mapping block that computes a depth map characterizing a portion of an environment imaged by the imaging system.

The substrate can include a printed circuit board or other rigid platform or substrate, which can be mounted within a housing using one or more corresponding attachment structures. Further, as described above, an application of an external force or bending moment to a portion of the housing may cause the substrate to deflect downward (or upward) from an initial position of the substrate within the housing. The deflection of the substrate may cause a misalignment of the optical axes of the components of the imaging system, and introduce errors into depth map data derived from image data captured by the component optical devices.

To detect and characterize the deflection resulting from the application of the external force or bending moment, the imaging system also includes a flexion sensor (also referred to as a "bend sensor") disposed on a surface of the substrate. In some examples, as described below, the flexion sensor can be a one-dimensional flexion sensor that measures a maximum deflection of the substrate along a single bending axis, such as a yaw axis of the imaging system. In other examples, the flexion sensors can include a multi-dimensional sensor that measures a deflection of the substrate along multiple bending axes, such as the yaw axis of the imaging system, a pitch axis of the imaging system, or a roll axis of the imaging system. Examples of the flexion sensor include a conductive, ink-based sensor, a fiber-optic sensor, a sensor that incorporates a conductive fabric, thread, or polymer, a strain gauge, a piezo-restrictive sensor, or other zeroth-order sensors that measure deflection as a function (e.g., a linear or quadratic function) of electrical resistance.

In additional examples, the system also includes a tangible, non-transitory storage medium or memory, which stores executable instructions, and a processing unit, such as a microprocessor or central processing unit (CPU), coupled to the storage medium or memory and configured to execute the stored instructions. The processing unit can also be coupled to the flexion sensor to receive, process, and condition output signals indicative of the deflection of the substrate along the one or more bending axes, and to the imaging system to receive and process image data captured by the corresponding optical devices. Additionally, in certain instances, the tangible, non-transitory storage medium or memory also stores data characterizing the intrinsic misalignment of the components of the imaging system. As described above, the intrinsic misalignment represents a misalignment of the optical components present prior to, and subsequent to, the application of the external force or bending moment to the housing of the imaging system, and can result from manufacturing tools, processes, or conditions.

The processing unit may execute the stored instructions to process and condition the output signal received from the flexion sensor. The processing unit may correlate the processed and conditioned output signal to a corresponding deflection amount, e.g., as measured in angular or positional units. When the deflection amount is determined to exceed a threshold value, the processing unit can actively correct for both the intrinsic misalignment of the imaging system and an induced misalignment of the optical devices resulting from the deflection of the substrate. The processing unit can further generate depth map data that reflects the correction of the intrinsic and induced misalignments, and store the generated depth map data in a tangible, non-transitory memory device.

Figure 1B:
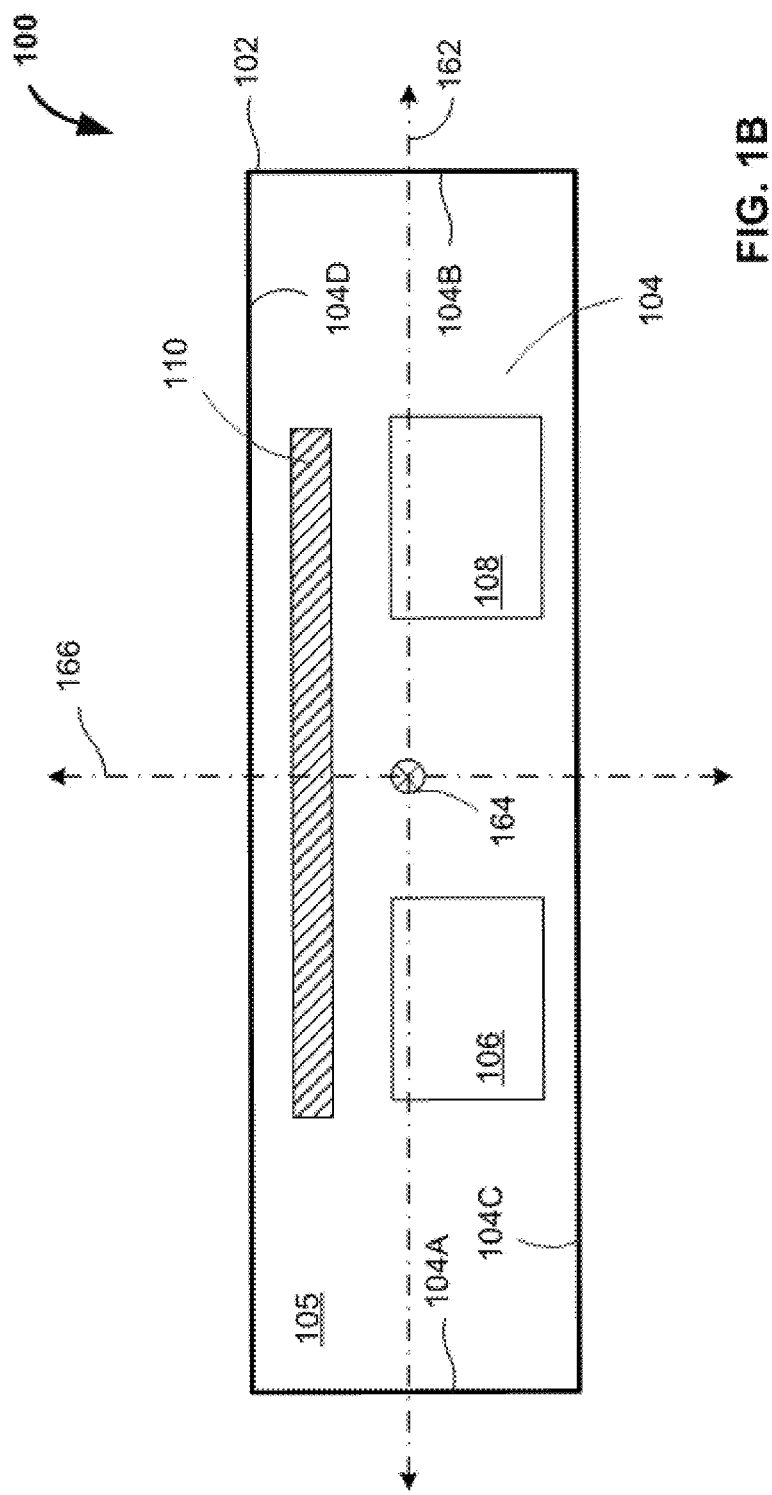
FIG. 1B is a plan view of an exemplary imaging system, according to some examples.

FIGS. 1A and 1B are diagrams illustrating portions of an exemplary imaging system 100. As illustrated in FIGS. 1A and 1B, imaging system 100 includes a housing 102 and a substrate 104 attached to an interior surface 102A of housing 102. Substrate 104 may be attached to interior surface 102A along lateral edges 104A and 104B using corresponding attachment structures 103A and 103B. Longitudinal edges 104C and 104D (shown in FIG. 1B) can remain free and capable of translation across interior surface 102A. Substrate 104 can include a printed circuit board (e.g., a PCB) formed from a thermoplastic or thermosetting base material. Examples of attachment structures 103A and 103B include passive attachment structures, such as hinges, fulcrums, or combinations of hinges and fulcrums (not shown). Further, attachment structures 103A and 103B can be formed from, or incorporate, flexible materials compatible with substrate 104, such as a rubber or foam material, a flexible thermoplastic material (e.g., the thermoplastic PCB material), or a metallic or plastic spring structure.

As further illustrated in FIGS. 1A and 1B, imaging system 100 also includes optical devices 106 and 108, which are disposed at corresponding positions along a surface 105 of substrate 104. For example, the corresponding positions can establish a separation distance between optical devices 106 and 108 when positioned on surface 105. Further, optical devices 106 and 108 can be attached to surface 105 using any of a number of mechanical fastening techniques, such as soldering or through adhesives. In certain examples, optical device 106 and/or optical device 108 can be configured to capture image data characterizing a disposition of one or more objects within an environment visible to optical devices 106 and 108 (e.g., within an "imaged" environment).

In one example, imaging system 100 represents a dual-camera stereo-vision system, and optical devices 106 and 108 each include an image sensor capable of detecting and capturing visible light. Examples of image sensors include, but are not limited to, a charge-coupled device (CCD) a complimentary metal-oxide semiconductor (CMOS) sensor, or a hybrid image sensor that combines elements of CCD and CMOS architectures. In some instances, the image data captured by optical devices 106 and 108 can include a stereoscopic pair of images that represent the visible portion of the imaged environment from slightly different view-points (e.g., corresponding to the locations of optical devices 106 and 108, respectively). As described below, a depth mapping block coupled to optical devices 106 and 108 (e.g., as executed by a processing unit of imaging system 100) can apply one or more stereo-vision techniques to the captured image data, and generate depth values characterizing each position within the imaged environment based on a computed pixel offset between the position in each of the pair of stereoscopic images. The generated depth values may be included as part of a depth map.

In other examples, imaging system 100 can include a structured-light system having a laser emitter (e.g., optical device 106), a diffraction grating disposed between the emitter and the imaged environment (not depicted in FIG. 1A or 1B), and an image sensor (e.g., optical device 108) capable of detecting and captured the emitted light. The laser emitter can include an infrared laser, and the image sensor can include a CCD sensor, a CMOS sensor, or a hybrid image sensor capable of detecting infrared radiation. In some instances, the infrared laser is configured to emit a single beam of infrared radiation. The single beam of infrared radiation is split into multiple beams by the diffraction grating to project a structured pattern onto objects disposed within the imaged environment. Optical device 108 captures the projected structured pattern. The depth mapping block can correlate the captured image data- and the captured pattern against a predefined reference pattern located at an imaging plane of known depth within the imaged environment. As described below, the depth mapping block can generate depth values characterizing each position within the imaged environment based on computed offsets between speckle positions detected within the captured image data.

Further, imaging system 100 can also include a time-of-flight system having a laser emitter (e.g., optical device 106) and a corresponding image sensor (e.g., optical device 108). For instance, the laser emitter can be configured to emit near-infrared (IR) radiation modulated to illuminate one or more objects within the imaged environment, and the corresponding image sensor can include, a CCD sensor, a CMOS sensor, or a hybrid sensor capable of capturing the emitted near-IR radiation. In some examples, as described below, optical device 108 collects the radiation reflected by the illuminated objects, and the depth mapping block can compute depth values characterizing each position within the imaged environment based on a comparison of the phase shift between the modulated light and a reflected component of the modulated light.

The subject matter is not limited to these examples of imaging systems, and in further examples, imaging system 100 can include any additional or alternative system having multiple calibrated and aligned optical devices. Further, although described in terms of optical devices 106 and 108, imaging system 100 can include any number of calibrated and aligned optical devices. For example, imaging system 100 can include additional image sensors (e.g., CCD sensors, CMOS sensors, or hybrid sensors) capable of detecting and capturing visible radiation or radiation having a specific wavelength or wavelength range, such as IR (e.g., near-IR) radiation.

Imaging system 100 also includes a flexion sensor 110 that detects and characterizes a deflection of substrate 104 resulting from external forces or bending moments applied to housing 102. In one example, flexion sensor 110 can be disposed on surface 105 of substrate 104, e.g., at a position between optical devices 106 and 108 and longitudinal edge 104D. The subject matter is not limited to this exemplary disposition of flexion sensor 110 along surface 105, and in other instances, flexion sensor 110 may be disposed at other appropriate position on surface 105, such as a position between optical device 106 or optical device 108 and longitudinal edge 104C, or at a position between optical device 106 or optical device 108 and longitudinal edge 104D.

For example, as depicted in FIGS. 1A and 1B, flexion sensor 110 is a one-dimensional flexion sensor that measures a deflection of substrate 104 in a direction normal to a single bending axis, such as axis 162. In one example, an electrical resistance measured across flexion sensor 110 is linearly proportional to the deflection of substrate 104 along the single bending axis, and as such, flexion sensor 110 can be approximated as a zeroth-order sensor. In other examples, flexion sensor 110 can also include a multi-dimensional sensor that measures a deflection of substrate 104 along multiple bending axes, such as axes 162, 164, and/or 166. Alternatively, a plurality of orthogonally-mounted one-dimensional flexion sensors can be used. Examples of flexion sensor 110 include a conductive, ink-based sensor, a fiber-optic sensor, a sensor formed from a conductive fabric, thread, or polymer, a strain gauge, a piezo-restrictive sensor, or other zeroth-order sensors that measure deflection as a linear function of electrical resistance.

In some instances, a maximum deflection amount of substrate 104 can be derived from the deflection measured by flexion sensor 110, e.g., through an extrapolation of the measured deflection. In other instances, flexion sensor 110 can be disposed along surface 105 at a position that facilitates a direct measurement of the maximum deflection amount by flexion sensor 110.

Further, although not depicted in FIGS. 1A and 1B, imaging system 100 can also include additional optical elements that facilitate an emission of radiation by optical devices 106 or 108, or that facilitate a capture of imaging data by optical devices 106 or 108. For example, imaging system 100 can include one or more lens elements that provide a focusing capability to an image sensor incorporated in optical devices 106 or 108 (e.g., CCD sensors, CMOS sensors, or hybrid image sensors included within the dual-camera stereo-vision system). In other instances, imaging system 100 can include one or more optical filters that facilitate a capture of IR (e.g., near-IR) radiation by an image sensor included within optical devices 106 or 108 (e.g., as included within the structured-light system or the time-of-flight system). The subject matter is not limited to these examples of additional optical elements, and in other examples, imaging system 100 may include any additional or alternative optical element appropriate to optical devices 106 and 108.

Figure 2A:
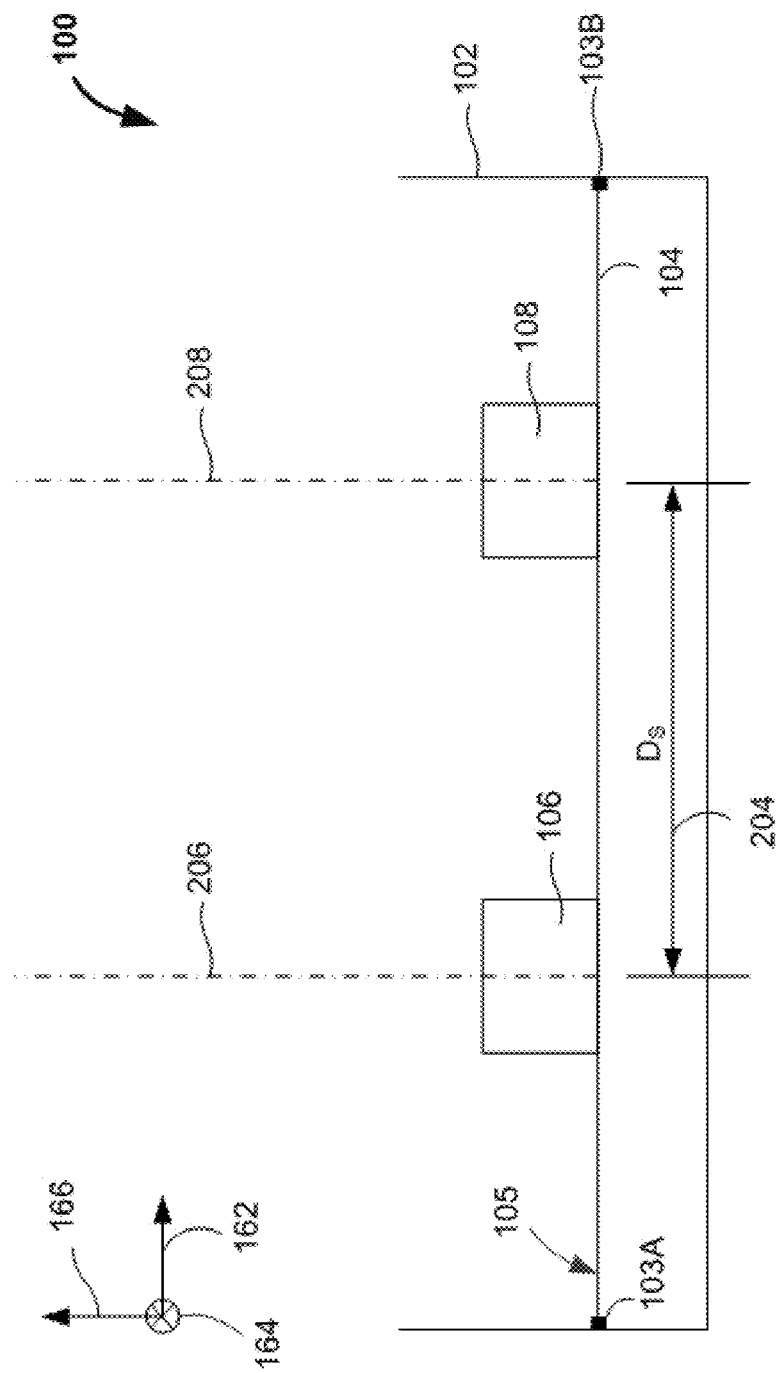
FIGS. 2A and 2B are sectional views of an exemplary imaging system, in accordance with some examples.

As described above, imaging system 100 may establish and maintain a specified positional relationship between optical devices 106 and 108 in the absence of any external force or bending moment. For instance, as illustrated in FIG. 2A, imaging system 100 may establish and maintain a predetermined separation distance 204 between optical devices 106 and 108 along surface 105 (e.g., Ds in FIG. 2A). In addition, optical devices 106 and 108 can be disposed on surface 105 such that: (i) optical axis 206 of optical device 106 is parallel to optical axis 208 of optical device 108; and (ii) optical axes 206 and 208 are each perpendicular to surface 105 and to an imaging plane 210 disposed within the imaged environment. In certain instances, the positional relationship between optical devices 106 and 108 (e.g., the position and orientation of optical devices 106 and 108 along surface 105) can be established for imaging system 100 during manufacturing processes that attach optical devices 106 and 108 to substrate 104 and that install substrate 104 into housing 102.

In some examples, an accuracy at which optical devices 106 and 108 are positioned and oriented on surface 105 depends on manufacturing tools, manufacturing processes, and manufacturing conditions. For instance, the alignment of optical axes 206 and 208 may vary due to manufacturing conditions (e.g., due to limitations in alignment measuring devices, etc.). Instead, optical devices 106 and 108 may be positioned and oriented on surface 105 such that optical axes 206 and 208 are substantially parallel to each other (and substantially perpendicular to surface 105 and imaging plane 210). There may be a small angular deviation between the substantially parallel orientations of each of optical axes 206 and 208.

The angular displacement between the substantially parallel orientations can establish an intrinsic misalignment of imaging system 100. The intrinsic misalignment can be determined at the time of manufacturing or through an initial calibration process. In some instances, imaging system 100 can perform one or more of the exemplary processes described below, to correct captured image data to account for the intrinsic misalignment, e.g., based on digital manipulation of the captured image data.

Imaging system 100 can also be exposed to certain external applied forces or bending moments prior, during, or subsequent to operation by one or more users. For instance, a user of imaging system 100 can mount imaging system 100 on a tripod or mounting structure, which applies an external force or bending moment on a portion of imaging system 100. In other instances, the user may drop imaging system 100 onto a surface, such as a desktop or a floor, and a resulting impact between housing 102 and the surface can deform housing 102 and apply stresses to substrate 104. As described below, the applied forces or bending moments (and resulting stresses) can deflect substrate 104 and induce an additional misalignment of optical devices 106 and 108, which can introduce errors in depth map data derived from the image data captured by now-misaligned optical devices 106 and 108.

Figure 2B:
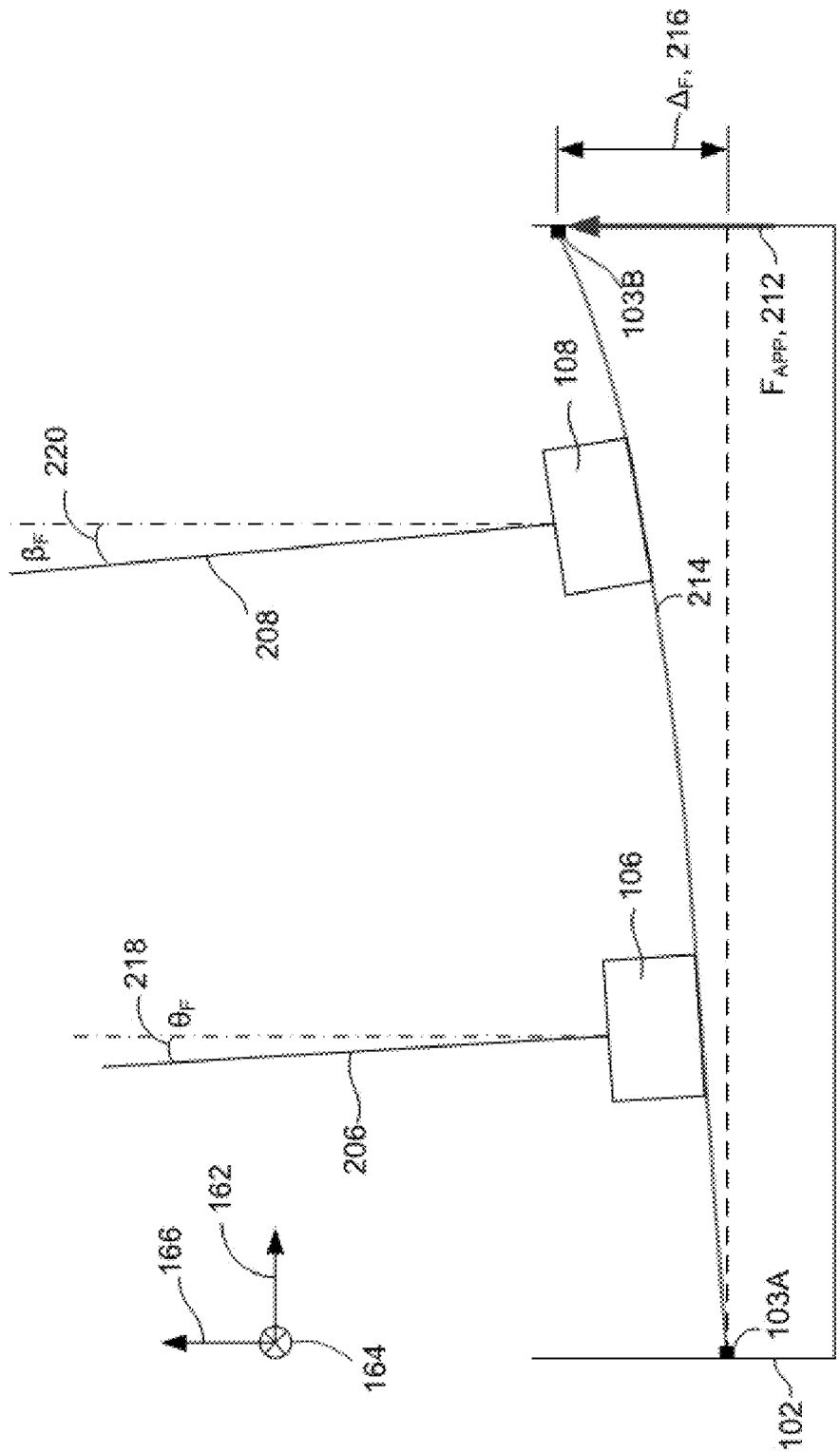

As illustrated in FIG. 2B, an external force 212 (e.g., $F_{APP}$ in FIG. 2B) can be applied normal to axis 164 of housing 102. Axis 164 may, for example, correspond to a yaw axis of imaging system 100. The application of external force 212 induces a bending moment in substrate 104 (e.g., as fixed to housing 102 along lateral edges 104A and 104B), which causes substrate 104 to bend along axis 162 and assume a deflected shape 214. In one instance, the application of external force 212 and the resulting bending moment induce a deflection 216 (e.g., $\Delta_F$ in FIG. 2B) in substrate 104. Further, the deflection 216 of substrate 104 by external force 212 also causes a displacement of optical axes 206 and 208 and a corresponding misalignment of optical axis 206 with respect to optical axis 208 (or a corresponding misalignment of optical axis 208 with respect to optical axis 206).

Depending on the configuration of the interface between the housing 102 and the substrate 104, the housing 102 may apply a bending moment to the substrate 104 at a location where the substrate 104 engages the housing 102. For example, if the substrate 104 is secured to the housing 102 by welding, soldering or adhesive, the housing 102 can impart a bending moment on the substrate 104.

Due to the deflection of substrate 104, an angular position of optical axis 206 shifts about yaw axis 164 by a corresponding angular displacement 218 (e.g., $\theta_F$ in FIG. 2B), and an angular position of optical axis 208 shifts about yaw axis 164 by a corresponding angular displacement 220 (e.g., $\beta_F$ in FIG. 2B). Angular displacements $\theta_F$ 218 and $\beta_F$ 220 of optical axes 206 and 208 (e.g., "yaw angle errors") can result in a misalignment of optical axis 206 relative to optical axis 208 (or a misalignment of optical axis 208 relative to optical axis 206), and can introduce errors in image data captured by optical devices 106 or 108. These errors may also propagate into depth map data derived from the captured image data. By way of example, for a deflection 216 equivalent to 100 μm, corresponding to angular displacements $\theta_F$ 218 and $\beta_F$ 220 of 0.1 degree, the resulting misalignment of optical devices 106 and 108 can introduce a depth error of 15 cm for a position within the imaged environment disposed 2.0 m from imaging system 100, e.g., an error of 7.5% in the computed depth value.

In some examples, flexion sensor 110 can measure deflection 216, which results from the application of external force 212, and generate an output signal indicative of measured deflection 216. Based on the output signal, imaging system 100 may perform one or more of the exemplary processes described below to actively correct the image data to compensate for measured deflection 216 and further, for the intrinsic misalignment of imaging system 100. By actively correcting the captured image data for intrinsic misalignments and induced yaw-angle errors, image system 100 may generate depth map data that accurately characterizes depths of positions within the imaged environment, even in the presence of applied external forces.

Figure 3:
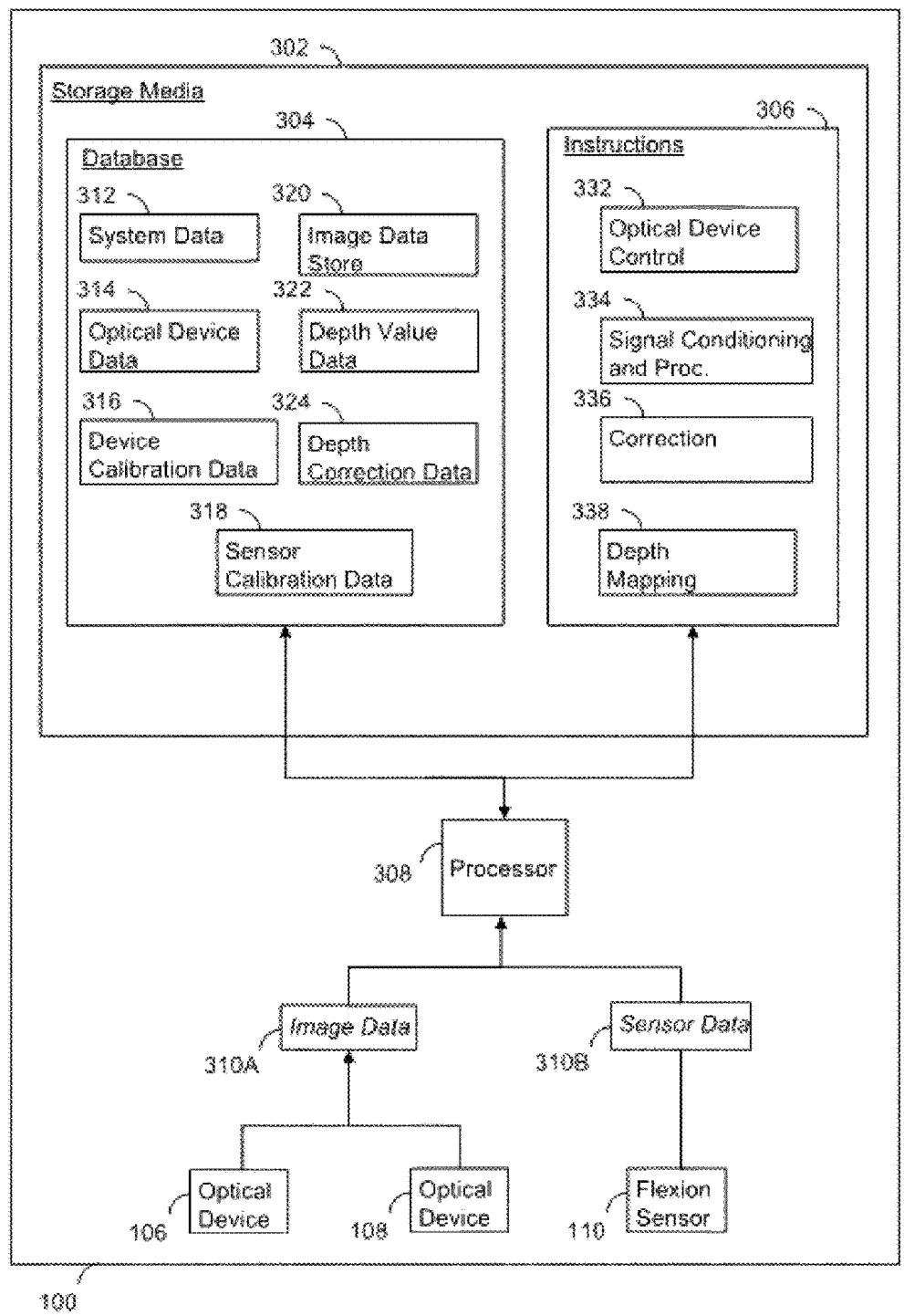
FIG. 3 is a block diagram illustrating components of an exemplary imaging system, according to some examples.

FIG. 3 is a schematic block diagram illustrating exemplary components of imaging system 100. Imaging system 100 can include a tangible, non-transitory, machine-readable storage medium (e.g., "storage media") 302 having a database 304 and instructions 306 stored thereon. Imaging system 100 can include one or more processors, such as processor 308, for executing instructions 306 or for facilitating storage and retrieval of data at database 304. Processor 308 can also be coupled to one or more optical devices, such as optical devices 106 and 108, and a sensor, such as flexion sensor 110. Further, processor 308 can receive, as input data, image data 310A captured by optical devices 106 or 108 and sensor data 310B generated by flexion sensor 110, and can selectively execute portions of instructions 306 to actively correct the captured image data, or derived depth map data, for intrinsic misalignments and induced yaw-angle errors, as described below.

Database 304 may include a variety of data, such as system data 312 and optical device data 314. In one example, system data 312 can include values of parameters that characterize imaging system 100, such as dimensions of housing 102, dimensions of substrate 104, identities and characteristics of optical devices 106 and 108 (e.g., a CCD sensor, an IR laser emitter, etc.), positions of optical devices 106 and 108 along surface 105 of substrate 104, or a position of flexion sensor 110 along surface 105. In additional examples, system data 312 can also specify a threshold value that triggers active correction of image data and/or generated depth data using any of the exemplary processes described below. Further, optical device data 314 can specify values of additional parameters that characterize optical devices 106 and 108, along with configuration data specifying various operational modes of optical devices 106 and 108 (e.g., a capability to emit or detect radiation having specific wavelengths).

Database 304 can also include device calibration data 316, which characterizes an intrinsic misalignment of optical devices 106 and 108 due to limitations imposed by manufacturing tools, processes, or conditions. For example, due to limitations on optical alignment tools during the manufacturing process, an optical axis of optical device 106 may be substantially parallel to, and have an angular deviation from, an optical axis of optical device 108. The angular or positional shift between the optical axes of optical devices 106 and 108 can be identified and characterized during an initial calibration process implemented by a manufacturer, and device calibration data 316 specifies the positional or angular deviation, which characterizes the intrinsic malalignment of imaging system 100.

Figure 4:
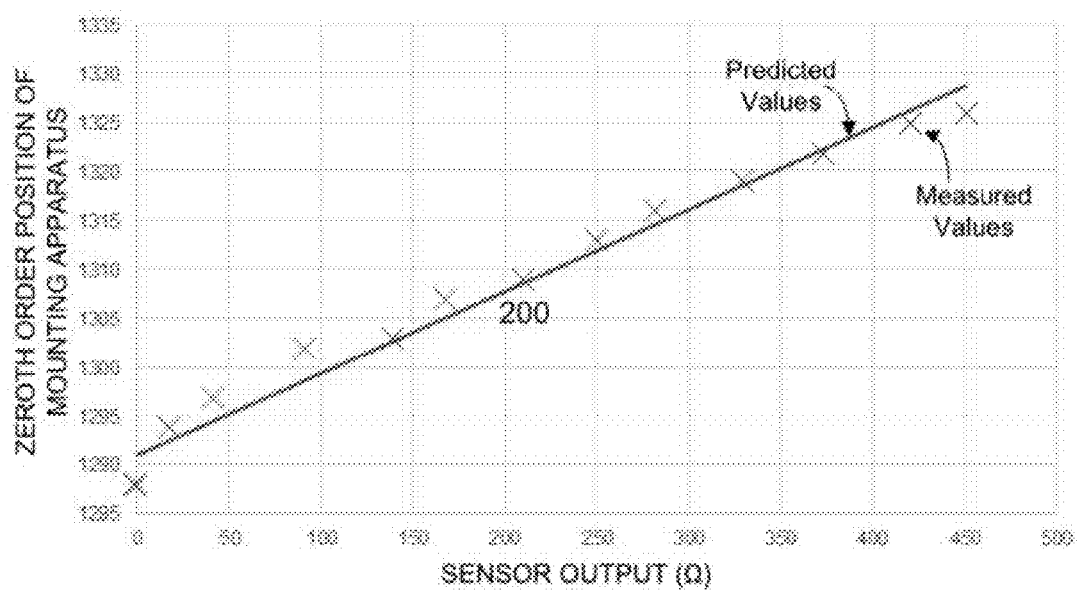
FIG. 4 is a diagram illustrating aspects of an operation of an exemplary sensor, according to some examples.

Further, database 304 includes sensor calibration data 318, which correlates sensor output of flexion sensor 110 with corresponding amounts of the deflection of substrate 104. For example, as described above, flexion sensor 110 can be characterized as a zeroth-order sensor, and the corresponding deflection amounts of the substrate 104 (e.g., values of positional or angular displacement) can vary as a linear function of the sensor output (e.g., values of electrical resistance). The sensor calibration data 318 can be in the form of a table. FIG. 4 illustrates a linear relationship between (measured and predicted) deflection amounts of substrate 104 and the sensor output of flexion sensor 110.

Referring back to FIG. 3, database 304 can also include image data store 320, which maintains raw image data captured by an image sensor incorporated within optical device 106 or optical device 108 (e.g., portions of image data 310A). Additionally, database 304 may include depth value data 322, which includes depth values and data specifying mapping functions for corresponding portions of the environment imaged by optical device 106 and/or optical device 108. In some examples, the depth values can constitute a portion of one or more depth maps, and depth value data 322 can store data characterizing the one or more depth maps.

Further, database 304 can include depth correction data 324, which correlates deflection amounts and computed depth data to corresponding depth correction values. In one example, depth correction data 324 can include a structured database that identifies a depth correction value corresponding to a data pair that includes (i) a determined amount of the deflection of substrate 104 (e.g., a deflection amount) and (ii) a computed value of a depth of a position within an imaged environment. For instance, given a determined deflection amount of 100 μm and a computed depth value of 2.0 m, the structured database may identify a depth correction value of 15 cm, and may specify that the computed depth value of 2.0 m should be increased by 15 cm to account for yaw angle errors resulting from the 100 μm deflection. In some instances, depth correction data 324 can be generated based on empirical data that correlates the deflection values and computed depth data to corresponding depth correction values, or based on prior corrections of the captured image data and/or the generated depth map data.

To facilitate understanding of the examples, instructions 306 are at times described in terms of one or more blocks configured to perform particular operations. As one example, instructions 306 can include an optical device control block 332 that manages an operation and a configuration of optical devices 106 and 108. For example, optical devices 106 and 108 can include an image sensor, such as CCD sensor, a CMOS sensor, or a hybrid CCD/CMOS sensor, capable of detecting and capturing light having visible light, such as IR (e.g., near-IR) radiation. Optical devices 106 and 108 can also include an emitter device, such as a laser emitter, capable of emitting modulated or unmodulated radiation at certain wavelengths, such as IR (e.g., near-IR) radiation. The subject matter is not limited to these examples of optical devices, and in other examples, imaging system 100 can include additional or alternative types or numbers of optical devices or elements, such as additional image sensors or laser emitters.

Instructions 306 can also include a signal conditioning and processing block 334 to condition and process sensor data generated by flexion sensor 110. For example, signal conditioning and processing block 334 can receive sensor data 310B, which reflects a value of electrical resistance associated with a current deformation of flexion sensor 110, and process sensor data 310B in a temporal or spatial domain to reduce noise or other artifacts. Additionally, in some instances, signal conditioning and processing block 334 can further process sensor data 310B to correlate the sensor output (e.g., the measured value of the electrical resistance) to a corresponding deflection amount of substrate 104 (e.g., deflection 216 of FIG. 2B). For example, signal conditioning and processing block 334 can access sensor calibration data 318 maintained in database 304. The database 304 converts sensor output (e.g., electrical resistance) to deflection amounts (e.g., in position units, such as micrometers, or in angular units, such as degrees), and determines the deflection amount that corresponds to the sensor output.

In one example, determined deflection amount (e.g., that corresponds to the sensor output of flexion sensor 110) represents a maximum amount by which substrate 104 deflects in response to the external force or bending moment. In other examples, signal conditioning and processing block 334 can derive the maximum amount of deflection from the determined deflection amount, dimensions of substrate 104, and/or the position of flexion sensor 110 along surface 105, e.g., through extrapolation or other processes.

Additionally, instructions 306 can include a correction block 336. In one example, correction block 336 can access data characterizing an intrinsic misalignment of imaging system 100 (e.g., as specified in device calibration data 316), and can apply various image processing techniques to portions of image data 310A to correct for the intrinsic misalignment of imaging system 100. Examples of these image processing techniques include, but are not limited to, processes that delete or "crop" portions of image data 310A to adjust for horizontal or vertical shifts between optical devices 106 or 108, or processes that rotate portions of image data 310A to reflect angular or rotational shifts between optical devices 106 and 108. The subject matter is not limited to these exemplary image processing techniques, and in other examples, correction block 336 may implement an additional or alternative process that corrects image data 310A for the intrinsic misalignment of imaging system 100.

Further, and when a maximum deflection amount exceeds a threshold value (e.g., as maintained within system data 312), correction block 336 can also correct for the yaw angle errors that result from the deflection of substrate 104. For example, and in response to the yaw angle errors that result from the deflection of substrate 104 (e.g., $\theta_F$ and $\beta_F$ in FIG. 2B), correction block 336 can process portions of image data 310A to correct and compensate for the yaw angle errors. For example, correction block 336 can correct for the yaw angle errors by dimensionally adjusting portions of the image data 310A that correspond to certain regions within the imaged environment (e.g., by transforming or projecting portions of image data 310A).

In other examples, correction block 336 can also process portions of generated depth map data to correct for the yaw angle errors in the orientation of optical devices 106 and 108 (e.g., $\theta_F$ and $\beta_F$ in FIG. 2B), which result from the deflection in substrate 104. For example, correction block 336 can access depth correction data 324 within database 304, and obtain data correlating determined deflection values and computed depth data to corresponding depth correction values. Based on the obtained data, correction block 336 can determine a depth correction value that corresponds to the determined deflection amount of substrate 104 (e.g., as determined from sensor data 310B) and each depth value included within the generated depth map data. Correction block 336 can adjust each depth value within the generated depth map data in accordance with a corresponding depth correction value to correct the generated depth map data for the deflection and resulting yaw angle errors.

Additionally, based on device calibration data 316, correction block 336 can determine an intrinsic amount of deflection associated the intrinsic misalignment of imaging system 100 (e.g., an intrinsic deflection amount while no external force is applied to the substrate 104). In one example, correction block 336 can also adjust the yaw angle errors (e.g., $\theta_F$ and $\beta_F$ in FIG. 2B), which result from the application of the external force to substrate 104, to account for the intrinsic deflection amount. Correction block 336 can further apply one or more of the image processing techniques described above (e.g., modify, crop, rotate, project, or transform portions of the captured image data) to correct the captured image data for the adjusted yaw angle errors. By correcting the captured image data for these adjusted yaw angle errors, correction block 336 can simultaneously compensate for both the intrinsic misalignment of imaging system 100 and for the deflection of substrate 104 that results from the application of the external force to housing 102.

In other examples, correction block 336 can generate an adjusted deflection amount that accounts for the maximum deflection amount of substrate 104 (e.g., resulting from the application of the external force to housing 102) and the intrinsic deflection amount (e.g., resulting from the intrinsic misalignment of imaging system 100). For instance, the adjusted deflection amount can represent a linear combination of the maximum and intrinsic deflection amounts. Based on the data correlating determined deflection values and computed depth data to corresponding depth correction values, correction block 336 can determine a depth correction value that corresponds to the adjusted deflection amount and each depth value included within the generated depth map data. Correction block 336 can adjust each depth value within the generated depth map data in accordance with a corresponding depth correction value to correct the generated depth map data for both the intrinsic misalignment of imaging system 100 and for the deflection of substrate 104.

Instructions 306 can also include a depth mapping block 338 that generates at least one depth value for an imaged portion of the environment based on portions of image data 310A. In one example described above, image data 310A can include a stereoscopic pair of images that represent portions portion of the environment imaged by image sensors incorporated in optical devices 106 and 108, respectively. Each position within the imaged portion of the environment portion can be characterized by an offset (measured in pixels) between the pair of images, and the offset is proportional to a distance between the position and imaging system 100. Depth mapping block 338 can further establish the pixel offset as the depth value characterizing the position within the environment. For example, depth mapping block 338 can establish a value proportional to that pixel offset as the depth value characterizing the position within the environment, and associate the computed depth value with the corresponding position within a depth map of the imaged portion of the environment. Depth mapping block 338 can store the depth value within a portion of database 304, e.g., within depth value data 322. Depth mapping block 338 can also store data characterizing the generated depth map within a portion of depth value data 322.

In other examples, imaging system 100 can represent a structured-light system, and image data 310A includes patterned IR radiation captured having an IR laser emitter (e.g., optical device 106), a diffraction grating disposed between the emitter and the imaged environment, and an image sensor capable of detecting and capturing the reflected IR radiation (e.g., optical device 108). In some instances, the IR laser emits a single beam of infrared radiation, which is split into multiple beams by the diffraction grating to project a structured pattern onto the imaged environment. Optical device 108 captures the projected structured pattern, and depth mapping block 338 can correlate the pattern within the resulting image data (e.g., portions of image data 310A) against a predefined reference pattern located at an imaging plane of known depth within the imaged environment. Further, depth mapping block 338 can identify and compute offsets between speckle positions within the image data, and can generate depth values characterizing each position within the imaged environment based on the computed offsets. As described above, depth mapping block 338 can store the depth values and/or data characterizing the generated depth map within depth value data 322 of database 304.

Further, in additional examples, imaging system 100 can also include a time-of-flight system having a laser emitter (e.g., optical device 106) and a corresponding image sensor (e.g., optical device 108). For instance, the laser emitter can be configured to emit collimated near-infrared (IR) radiation modulated to illuminate one or more objects within the imaged environment, and the corresponding image sensor can include, a CCD sensor, CMOS sensor, or hybrid sensor capable of capturing near-IR radiation. Optical device 108 collects the radiation reflected by the illuminated objects, and depth mapping block 338 can compute depth values characterizing each position within the imaged environment based on a comparison of the phase shift between the modulated light and a reflected component of the modulated light (e.g., as included in portions of image data 310A). Depth mapping block 338 can store the depth values and/or data characterizing the generated depth map within depth value data 322 of database 304.

The subject matter is not limited to the examples of depth-mapping processes described above, and depth mapping block 338 can apply additional or alternative image processing techniques to captured image data to generate the depth map characterizing the imaged environment. For example, depth mapping block 338 can process a portion of captured image data (e.g., image data 310A) to determine a similarity with prior image data characterizing a previously analyzed portion of the environment. In response to the determined similarity, depth mapping block 338 can access database 304 and obtain data specifying the mapping function for the previously analyzed portion of the environment (e.g., from depth value data 322). Depth mapping block 338 can generate the depth values and/or the depth map for the portion of the captured image data directly and based on an output of the applied mapping function.

Figure 5:
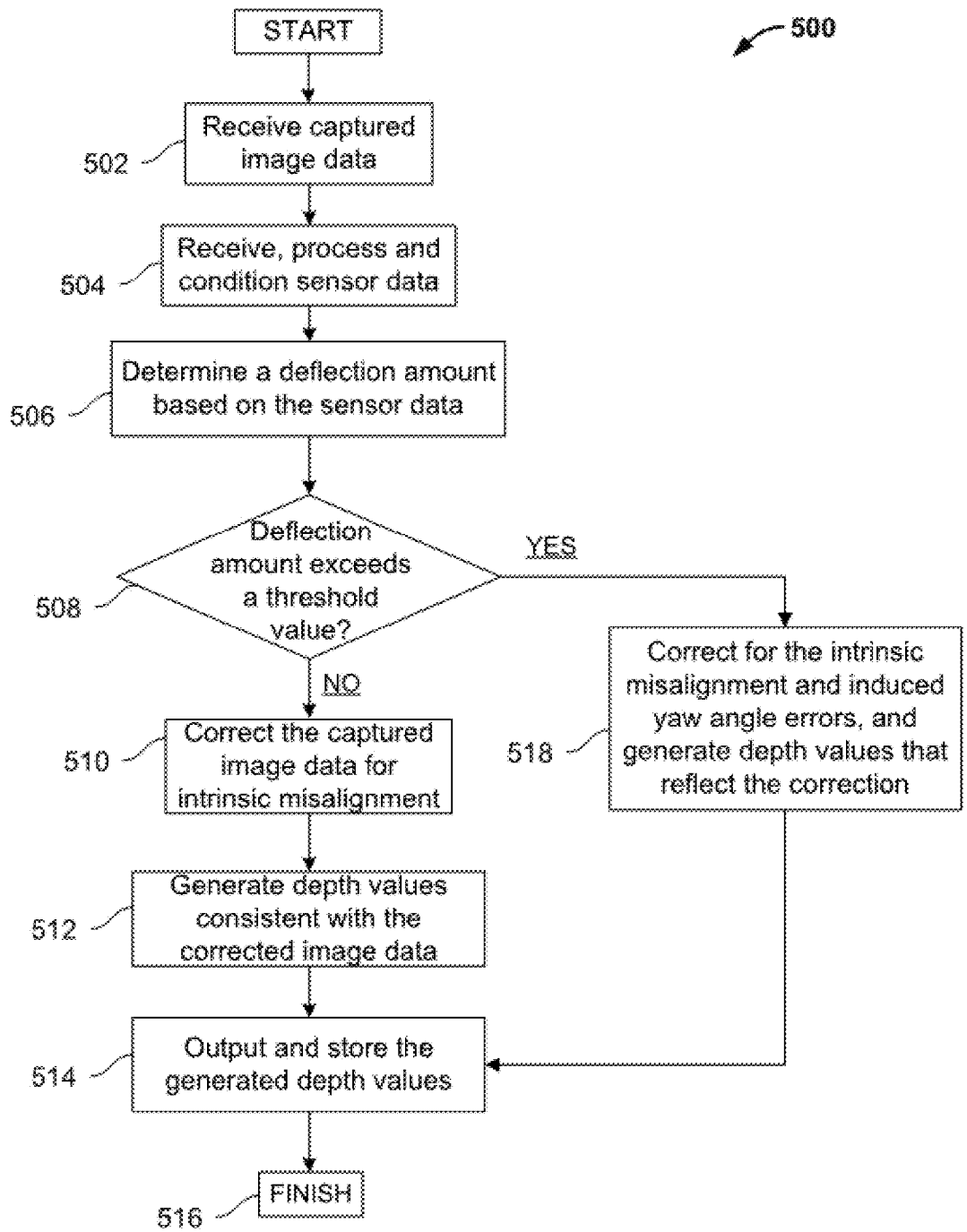
FIG. 5 is a flowchart of an exemplary process for correcting intrinsic and induced alignment errors between components of an imaging system, in accordance with some examples.

FIG. 5 is a flowchart of exemplary process 500 that corrects for intrinsic and induced alignment errors among optical devices of an imaging system, in accordance with one implementation. Process 500 can be performed by one or more processors executing instructions locally at an imaging system, such as imaging system 100 of FIG. 3. Accordingly, the various operations of process 500 can be represented by executable instructions stored in storage media of one or more computing platforms, such as storage media 302 of imaging system 100.

Referring to FIG. 5, imaging system 100 can receive image data captured by one or more optical devices, such as optical devices 106 and 108 (e.g., in block 502). In one example, optical device control block 332, when executed by processor 308 of imaging system 100, can access storage media 302 and obtain configuration data specifying operation modes of optical devices 106 and 108, e.g., from optical device data 314. Optical device control block 332 can generate instructions that cause optical device 106 or optical device 108 to capture image data in accordance with the obtained configuration data, and optical device control block 332 can store the captured image data within a portion of storage media 302, e.g., image data store 320.

For example, as described above, imaging system 100 can represent a dual-camera stereo-vision system, and the captured image data can include a stereoscopic pair of images that represent portions of the environment imaged by image sensors incorporated in optical devices 106 and 108. In other examples, imaging system 100 can represent a structured-light system, or alternatively, a time-of-flight system, and the captured image data can include infrared (IR) (e.g., near-IR) image data captured by optical device 108, as described above. The subject matter is not limited to these examples of imaging systems and captured image data, and in additional examples, imaging system 100 can incorporate any additional or alternative set of aligned and calibrated optical devices, which can capture image data indicative of detected visible light, IR (e.g., near-IR) radiation, or radiation having other wavelengths.

Imaging system 100 can also receive sensor data indicative of a deflection of a substrate that supports the one or more optical units (e.g., in block 504). For example, imaging system 100 may include a sensor, e.g., flexion sensor 110 of FIG. 1A, disposed on surface 105 of substrate 104, which also supports optical devices 106 and 108. In response to an application of an external force to a portion of a housing of imaging system 100 (e.g., housing 102 of FIG. 2B), substrate 104 bends about an axis orthogonal to the longitudinal axis of the substrate 104. The substrate 104 deflects downward (or upward) from its initial position within housing 102. The deflection of substrate 104 can result in a misalignment of optical devices 106 and 108 and can introduce one or more yaw angle errors.

Flexion sensor 110 can monitor the bending of substrate 104, and can generate and output sensor data indicative of a deflection amount that characterizes the deflection of substrate 104. In one example, signal conditioning and processing block 334, when executed by processor 308, can receive the sensor data from flexion sensor 110, and can process the sensor data in a temporal or spatial domain to reduce noise and other artifacts (e.g., in block 504).

Further, imaging system 100 can also determine the amount of deflection based on the received sensor data (e.g., in block 506). In some examples, signal conditioning and processing block 334, as executed by processor 308, can further process the sensor data and convert that sensor data (e.g., the measured value of the electrical resistance) to a corresponding deflection amount of substrate 104 (e.g., deflection 216 of FIG. 2B). For instance, signal conditioning and processing block 334 can access storage media 302 and obtain calibration data (e.g., from sensor calibration data 318) that converts sensor output to deflection amounts (e.g., in position units, such as micrometers, or in angular units, such as degrees). Based on the obtained calibration data, signal conditioning and processing block 334 can determine the deflection amount that corresponds to the received sensor data.

Imaging system 100 can also determine whether the deflection amount exceeds a threshold value (e.g., in block 508). For instance, signal conditioning and processing block 334, as executed by processor 308, can access storage media 302, and can obtain data identifying the threshold value, e.g., from system data 312. In one example, the threshold value may be a predetermined and fixed value, such as a flexural tolerance of substrate 104. In other examples, the threshold value may vary based on factors that include, but are not limited to, environmental characteristics (e.g., an ambient temperature), characteristics of optical devices 106 or 108, or operational characteristics of imaging system 100. Signal conditioning and processing block 334 can compare the deflection amount against the obtained threshold value. Upon a determination that the deflection exceeds the threshold value, imaging system 100 can selectively correct the captured image data to compensate for the misalignment and the yaw angle error induced by the deflection of substrate 104.

Upon imaging system 100 determining that the deflection amount fails to exceed the threshold value (e.g., block 508; NO), imaging system 100 can correct the captured image data for the intrinsic misalignment of imaging system 100 (e.g., in block 510). For example, the deflection amount may fall within the flexural tolerance of substrate 104. Any resulting yaw angle error may be insufficient to disrupt the orientation of optical devices 106 and 108. In some instances, correction block 336, when executed by processor 308 of imaging system 100, can access storage media 302 and obtain data characterizing the intrinsic misalignment of imaging system 100 (e.g., as specified in device calibration data 316) and portions of the captured image data (e.g., as maintained in image data store 320).

Correction block 336 can apply one or more of the image processing techniques listed above to correct the captured image data for the intrinsic misalignment of imaging system 100. For example, these image processing techniques can include, but are not limited to, processes that delete or "crop" portions of the captured image data to adjust for horizontal or vertical shifts between optical devices 106 or 108. Other techniques rotate and/or stretch portions of the captured image data to reflect angular or rotational shifts between optical devices 106 and 108.

Imaging system 100 can also generate depth value data consistent with the corrected image data (e.g., in block 512), and store portions of the corrected depth value data in one or more tangible, non-transitory storage media or memories (e.g., in block 514). For example, depth mapping block 338, when executed by processor 308 of imaging system 100, can apply one or more of the depth-mapping techniques discussed above to the corrected image data. The depth-mapping techniques can include stereo-vision techniques, structured-light techniques, or the time-of-flight techniques, for example. Based on the application of the one or more depth-mapping techniques, depth mapping block 338 can generate depth values that accurately characterizes depths of positions within the imaged environment, even in the presence of an intrinsic misalignment of imaging system 100. In some examples, depth mapping block 338 can also generate depth map data for the imaged environment that includes the generated depth values. Depth mapping block 338 can store the generated depth values and/or the generated depth map data within a corresponding portion of storage media 302, e.g., within depth value data 322. In some examples, exemplary process 500 is then completed in block 516.

Referring back to block 508, upon determination by imaging system 100 that the deflection amount exceeds the threshold value (e.g., block 508; YES), imaging system 100 establishes that the amount of the deflection, and the resulting yaw angle errors, are sufficient to disrupt the orientation of optical devices 106 and 108. In some examples, imaging system 100 can correct for both the intrinsic misalignment of imaging system 100 and the yaw angle errors that result from the deflection of substrate 104. In some examples, imaging system 100 can generate depth map data that reflects a correction of the intrinsic misalignment and the yaw angle errors (e.g., in block 518).

In one example, in block 518, imaging system 100 corrects portions of the captured image data for the intrinsic misalignment and the yaw angle errors, and generates depth values and/or depth map data that reflects the corrected image data. For instance, correction block 336, when executed by processor 308 of imaging system 100, can access storage media 302 and obtain device calibration data 316 characterizing the intrinsic misalignment of imaging system 100 and portions of the captured image data (e.g., as maintained in image data store 320). Correction block 336 can apply one or more of the image processing techniques described above (e.g., modify, crop, or rotate portions of the captured image data) to correct the captured image data for the intrinsic misalignment of imaging system 100.

Additionally, in response to the yaw angle errors that result from the deflection of substrate 104 (e.g., $\theta_F$ and $\beta_F$ in FIG. 2B), correction block 336 can further process the captured image data and correct the captured image data for the yaw angle errors. For example, correction block 336 can compensate for the yaw angle errors by dimensionally adjusting portions of the captured image data that correspond to certain regions within the imaged environment (e.g., by transforming or projecting portions of the captured image data). In response to the correction of the intrinsic misalignment and the yaw angle errors, depth mapping block 338, as executed by processor 308, can generate depth values and/or depth map data consistent with the corrected image data using any of the exemplary processes outlined above.

In another example, correction block 336, as executed by processor 308, can determine an intrinsic amount of deflection associated the intrinsic misalignment of imaging system 100, and can adjust the yaw angle errors (e.g., $\theta_F$ and $\beta_F$ in FIG. 2B), which result from the application of the external force to substrate 104, to account for the intrinsic amount of deflection. Correction block 336 can further apply one or more image processing techniques (e.g., modify, crop, rotate, project, or transform portions of the captured image data) to correct the captured image data for the adjusted yaw angle errors, as described above. In response to the correction of the adjusted yaw angle errors, which compensates for both the intrinsic misalignment of imaging system 100 and the deflection of substrate 104 due to the applied external force, depth mapping block 338, can generate depth values and/or depth map data consistent with the corrected image data using any of the exemplary processes outlined above.

In other examples, in reference to block 518, imaging system 100 can initially correct a portion of the captured image data for the intrinsic misalignment of imaging system 100 and generate depth values and/or depth map data consistent with the corrected image data. Then imaging system 100 can correct the generated depth values and/or depth map data to compensate for the yaw angle errors introduced by the deflection of substrate 104. Imaging system 100 can correct the captured image data for the intrinsic misalignment and correct the generated depth map data for the yaw angle errors. Additionally or alternatively, imaging system 100 can directly correct the captured image data for both the intrinsic misalignment and the yaw angle errors.

For instance, correction block 336, as executed by processor 308, can apply one or more of the image processing techniques described above (e.g., modify, crop, or rotate portions of the captured image data) to correct captured image data to compensate for the intrinsic misalignment of imaging system 100. Further, depth mapping block 338 can access the corrected image data, and generate corresponding depth map data based on an application of one or more of the depth-mapping techniques describe above (e.g., stereo-vision, structured-light, or time-of-flight techniques).

In response to the generation of the depth values and/or depth map data, correction block 336 can access storage media 302 and obtain correlation data converting deflection amounts and computed depth values to corresponding depth correction values (e.g., from depth correction data 324). Based on the correlation data, correction block 336 can determine a depth correction value that corresponds to the determined deflection amount of substrate 104 (e.g., as determined from the sensor data in block 506) and each of the depth values. Correction block 336 can adjust each of the depth values within the generated depth map data in accordance with a corresponding depth correction value. The corresponding depth correction value corrects the generated depth map data for the yaw angle errors introduced by the deflection of substrate 104. The corrected depth map data can accurately characterize the depths of positions within the imaged environment, even in the presence of the intrinsic misalignment and the induced yaw angle errors.

In further examples, in reference to block 518, imaging system 100 can correct the generated depth values and/or depth map data to compensate for both the intrinsic misalignment of imaging system 100 and the yaw angle errors introduced by the deflection of substrate 104. In one instance, depth mapping block 338, as executed by processor 308, can generate depth values and/or depth map data consistent with the captured image data using any of the exemplary processes outlined above. As described above, correction block 336, as executed by processor 308, can establish an adjusted deflection amount that adjusts the maximum deflection amount of substrate 104 (e.g., resulting from the application of the external force to substrate 104) to account for an intrinsic amount of deflection resulting from the intrinsic misalignment of imaging system 100).

Based on the data correlating determined deflection values and computed depth values to corresponding depth correction values, correction block 336 can determine a depth correction value that corresponds to the adjusted deflection amount and each depth value. Correction block 336 can adjust each depth value in accordance with a corresponding depth correction value to correct the generated depth values for both the intrinsic misalignment of imaging system 100 and for the deflection of substrate 104 that results from the application of the external force. In some examples, and using any of the processes described above, correction block 336 can also correct the generated depth values within the depth map data, or can generate corrected depth map data based on the corrected depth values.

Exemplary process 500 then passes back to block 514. Depth mapping block 338 can store portions of the generated and/or corrected depth values and/or depth map data in one or more tangible, non-transitory storage media or memories (e.g., in block 514). In some examples, exemplary process 500 is then completed in block 516.

The methods and system described herein can be at least partially embodied in the form of computer-implemented processes and apparatus for practicing the disclosed processes. The disclosed methods can also be at least partially embodied in the form of tangible, non-transitory machine readable storage media encoded with computer program code. The media can include, for example, random access memories (RAMs), read-only memories (ROMs), compact disc (CD)-ROMs, digital versatile disc (DVD)-ROMs, "BLUE-RAY DISC"™ (BD)-ROMs, hard disk drives, flash memories, or any other non-transitory machine-readable storage medium. When the computer program code is loaded into and executed by a computer, the computer becomes an apparatus for practicing the method. The methods can also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods can alternatively be at least partially embodied in application specific integrated circuits for performing the methods.

The subject matter has been described in terms of exemplary embodiments. Because they are only examples, the claimed inventions are not limited to these embodiments. Changes and modifications can be made without departing the spirit of the claimed subject matter. It is intended that the claims cover such changes and modifications.

We claim:

1. A method of generating at least one depth value, the method comprising:
   receiving, by one or more processors, captured image data from a first optical device having a first optical axis or a second optical device having a second optical axis;
   receiving, from a sensor, by the one or more processors, sensor data indicative of a deflection of a substrate that supports the first and second optical devices, the deflection resulting in a misalignment of the first optical axis relative to the second optical axis; and
   generating, by the one or more processors, a depth value based on the captured image data and the sensor data, the depth value reflecting a compensation for the misalignment of the first optical axis relative to the second optical axis.

2. The method of claim 1, wherein generating the depth value comprises:
   in response to a determination that an amount of the deflection exceeds a threshold value, correcting the captured image data for the misalignment of the first and optical axis relative to the second optical axis; and
   generating the depth value based on the corrected image data.

3. The method of claim 1, wherein:
   the method further comprises obtaining calibration data characterizing an intrinsic misalignment of the imaging system;
   generating the depth value comprises generating the depth value based on the captured image data, the sensor data, and the calibration data; and the depth value reflects a compensation for the intrinsic misalignment of the imaging system and the misalignment of the first optical axis relative to the second optical axis.

4. The method of claim 3, wherein generating the depth value further comprises:
correcting the captured image data for the intrinsic misalignment of the imaging system and misalignment of the first optical axis relative to the second optical axis; and
generating the depth value based on the corrected image data.

5. The method of claim 3, wherein generating the depth value further comprises:
correcting the captured image data for the intrinsic misalignment of the imaging system;
generating the depth value based on the corrected image data; and
correcting the depth value for the misalignment of the first optical axis relative to the second optical axis.

6. The method of claim 3, wherein generating the depth value further comprising:
generating the depth value based on the captured image data; and
correcting the depth value for the intrinsic misalignment of the imaging system and the misalignment of the first optical axis relative to the second optical axis.

7. The method of claim 1, wherein:
the misalignment of the first optical axis relative to the second optical axis comprises a yaw angle error in a direction of at least one of the first optical axis or the second optical axis, the yaw angle error resulting from the deflection of the substrate; and
the depth value reflects a compensation for the yaw angle error.

8. The method of claim 1, wherein:
receiving the sensor data comprises receiving the sensor data from a flexion sensor, the flexion sensor being configured to measure the deflection along at least one bending axis of the substrate; and
the method further comprises determining a deflection amount based in the sensor data.

9. The method of claim 8, wherein the flexion sensor comprises a conductive, ink-based sensor, a fiber-optic sensor, a sensor formed from a conductive fabric, thread, or polymer, a strain gauge, or a piezo-restrictive sensor.

10. The method of claim 1, wherein:
the imaging system comprises a housing, the substrate being disposed within the housing; and
the deflection of the substrate results from an application of an external force or bending moment by a portion of the housing.

11. The method of claim 10, wherein the substrate comprises a printed circuit board.

12. The method of claim 1, wherein:
the first optical device is an emitter of radiation; and
the second optical device is an image sensor.

13. A system for generating at least one depth value, the system comprising:
a non-transitory, machine-readable storage medium storing instructions; and
at least one processor configured to be coupled to the non-transitory, machine-readable storage medium, the at least one processor configured to execute the instructions to:
receive captured image data captured from a first optical device having a first optical axis or a second optical device having a second optical axis;
receive, from a sensor, sensor data indicative of a deflection of a substrate that supports the first and second optical devices, the deflection resulting in a misalignment of the first optical axis relative to the second optical axis; and
generate a depth value based on the captured image data and the sensor data, the depth value reflecting a compensation for the misalignment of the first optical axis relative to the second optical axis.

14. The system of claim 13, wherein the at least one processor is further configured to:
obtain calibration data characterizing an intrinsic misalignment of the imaging system; and
in response to a determination that a deflection amount exceeds a threshold value, generate the depth value based on the captured image data, the sensor data, and the calibration data, the depth value reflecting a compensation for the intrinsic misalignment of the imaging system and the misalignment of the first optical axis relative to the second optical axis.

15. The system of claim 14, wherein the at least one processor is further configured to:
correct the captured image data for the intrinsic misalignment of the imaging system and misalignment of the first optical axis relative to the second optical axis; and
generate the depth value based on the corrected image data.

16. The system of claim 14, wherein the at least one processor is further configured to:
correct the captured image data for the intrinsic misalignment of the imaging system;
generate the depth value based on the corrected image data; and
correct the depth value for the misalignment of the first optical axis relative to the second optical axis.

17. The system of claim 14, wherein the at least one processor is further configured to:
generate the depth value based on the captured image data; and
correct the depth value for the intrinsic misalignment of the imaging system and the misalignment of the first optical axis relative to the second optical axis.

18. The system of claim 14, wherein:
the non-transitory, machine-readable storage medium stores the calibration data; and
the at least one processor is further configured to extract the calibration data from a portion of the non-transitory, machine-readable storage medium.

19. The system of claim 13, wherein:
the misalignment of the first optical axis relative to the second optical axis comprises a yaw angle error in a direction of at least one of the first optical axis or the second optical axis, the yaw angle error being induced by the deflection of the substrate; and
the depth value reflects a compensation for the yaw angle error.

20. The system of claim 13, wherein:
the sensor comprises a flexion sensor, the flexion sensor being configured to measure the deflection along at least one bending axis of the substrate;
the flexion sensor comprises a conductive, ink-based sensor, a fiber-optic sensor, a sensor formed from a conductive fabric, thread, or polymer, a strain gauge, or a piezo-restrictive sensor; and the at least one processor is further configured to determine a deflection amount based on the sensor data.

21. The system of claim 13, wherein:
the imaging system comprises a housing, the substrate being disposed within the housing; and
the substrate comprises a printed circuit board; and
the deflection of the substrate results from an application of an external force to a portion of the housing.

22. The system of claim 13, wherein:
the first optical device comprises an emitter of radiation; and
the second sensor comprises an image sensor.

23. The system of claim 13, further comprising:
the first and second optical devices; and
a sensor connected to the substrate, the sensor generating at least a portion of the sensor data indicative of the deflection of the substrate.

24. An apparatus, comprising:
means for receiving captured image data captured by a first optical device having a first optical axis or a second optical device having a second optical axis;
means for receiving, from a sensor, sensor data indicative of a deflection of a substrate that supports the first and second optical devices, the deflection resulting in a misalignment of the first optical axis relative to the second optical axis; and
means for generating a depth value based on the captured image data and the sensor data, the depth value reflecting a compensation for the misalignment of the first optical axis relative to the second optical axis.

25. A non-transitory, machine-readable storage medium storing instructions that, when executed by at least one processor, perform a method comprising:
receiving captured image data captured by a first optical device having a first optical axis or a second optical device having a second optical axis;
receiving, from a sensor, sensor data indicative of a deflection of a substrate that supports the first and second optical devices, the deflection resulting in a misalignment of the first optical axis relative to the second optical axis; and
generating a depth value based on the captured image data and the sensor data, the depth value reflecting a compensation for the misalignment of the first optical axis relative to the second optical axis.

* * * * *